: US005544975A

United States Patent [19]
Vigneron et al.

[11] Patent Number: 5,544,975
[45] Date of Patent: Aug. 13, 1996

[54] METHOD FOR THE REHABILITATION OF POLLUTED SOILS AND INSTALLATION FOR THE IMPLEMENTATION OF THIS METHOD

[75] Inventors: André Vigneron, Parc des Roses; Jean-Pierre Codaccioni, Impasse de la Sauge, both of France

[73] Assignee: Sarp Industries, Limay, France

[21] Appl. No.: 314,509

[22] Filed: Sep. 28, 1994

[30] Foreign Application Priority Data

Sep. 28, 1993 [FR] France .................................. 93 11516

[51] Int. Cl.⁶ ......................................................... B09B 3/00
[52] U.S. Cl. ........................ 405/128; 134/25.1; 210/208; 588/251
[58] Field of Search ............................ 405/128; 588/249, 588/251, 256; 210/738, 208, 571; 134/25.1, 26

[56] References Cited

U.S. PATENT DOCUMENTS

| | | | |
|---|---|---|---|
| 1,837,191 | 12/1931 | Baldwin | 210/208 X |
| 4,715,965 | 12/1987 | Sigerson et al. | 134/25.1 |
| 4,969,775 | 11/1990 | Cappel et al. | 210/768 X |
| 5,053,082 | 10/1991 | Flanigan et al. | 134/26 |
| 5,056,541 | 10/1991 | Schade et al. | 134/25.1 |
| 5,234,504 | 8/1993 | Peterson et al. | 134/25.1 |
| 5,244,308 | 9/1993 | Mims | 134/25.1 |
| 5,310,285 | 5/1994 | Northcott | 405/128 X |
| 5,372,650 | 12/1994 | Laaoda et al. | 134/25.1 |
| 5,405,579 | 4/1995 | Melzer et al. | 422/26 |

FOREIGN PATENT DOCUMENTS

| | | | |
|---|---|---|---|
| 0471900 | 2/1992 | European Pat. Off. . | |
| 312986 | 11/1989 | Germany . | |
| 3821242 | 12/1989 | Germany . | |
| 3919788 | 7/1990 | Germany | 405/128 |
| 4019110 | 12/1991 | Germany . | |
| 418525 | 6/1992 | Germany . | |

Primary Examiner—David J. Bagwell
Assistant Examiner—Frederick L. Lagman
Attorney, Agent, or Firm—Browdy and Neimark

[57] ABSTRACT

In a method for the rehabilitation of polluted soils by means of a third substance, the polluted soils, excavated and processed beforehand, are introduced into a contacting cell in the lower part of which the injection of the third substance, towards the lateral walls of said cell, forms a polluted solution subsequently collected in the upper part while the soils continuously separated from the polluted solution are recovered at the lower part of said cell before being rinsed and dried.

24 Claims, 2 Drawing Sheets

METHOD FOR THE REHABILITATION OF POLLUTED SOILS AND INSTALLATION FOR THE IMPLEMENTATION OF THIS METHOD

BACKGROUND OF THE INVENTION

1. Field of the Invention

The present invention relates to the field of the rehabilitation of soils, and more specifically to the field of the rehabilitation of polluted soils by means of a third substance (generally—liquid).

Polluted soils constitute a heterogeneous system in which the polluted substance and the pollutant have a fundamentally different chemical nature. Indeed, the polluted substance has an essentially mineral nature while the pollutant has an essentially organic nature.

The third substance has a selective affinity for the pollutant and can thus advantageously be used to wash the polluted substance.

Should the third substance be a solvent, then a homogeneous, monophase solution would be obtained wherein the pollutant is the solute, the whole entity consisting of the polluted substance and the solution then forming a decantable biphase mixture.

2. Description of the Prior Art

Most of the methods used in the prior art consist in carrying out a washing of the polluted soils by percolation according to which the third substance, which is sprayed over a vessel containing the polluted soils, infiltrates these soils and is then recovered at the bottom of the vessel in the form of a polluted solution.

Such methods are slow because they achieve very mediocre quality contacting between the third substance and the polluted soils. Consequently, the extraction is done badly, and the depollution efficiency is low in relation to the quantity of third substance introduced. Furthermore, the infiltration of the third substance into the polluted soils is done along a preferred path sidetracking certain zones of the percolation vessel.

Certain methods, on the contrary, consist of an operation of washing by the mixing of the polluted soils and of the third substance in a mixing vessel.

Vigorous shaking promotes contacting but prompts an attrition of the soils generating fine particles that have to be processed with care.

Furthermore, these methods are discontinuous and call for a separation of the washed soils and of the pollutant solution obtained after the extraction of the pollutant. This separation is done in a subsequent step, by decantation.

Furthermore, the prior art methods generally call for equipment that cannot be used on the sites of the pollution. For example, the methods mentioned here above include notably percolation vessels or decantation vessels whose dimensions are such that they generally cannot be transported.

SUMMARY OF THE INVENTION

The aim of the invention is to obtain a method and an installation for the rehabilitation of polluted soils, by means of a third substance that provides a low-cost remedy to the above-mentioned drawbacks, notably by enabling efficient attrition-free contacting that requires no subsequent separation by decantation.

An object of the invention is a method for the rehabilitation of polluted soils by means of a third substance, according to which the polluted soils, excavated and processed beforehand, are introduced into a contacting cell, in the lower part of which the injection of the third substance, towards the lateral walls of said cell, forms a polluted solution subsequently collected in the upper part while the soils continuously separated from the polluted solution are recovered at the lower part of said cell before being rinsed and dried.

An object of the invention, furthermore, is an installation for the implementation of the above-described method comprising at least one contacting cell including, in its lower part, a hole for the injection of the third substance towards the side walls of said cell and an aperture for the removal of the soils and, in its upper part, a overflow chute.

BRIEF DESCRIPTION OF THE DRAWINGS

The invention will be understood more clearly from the following description of a non-restrictive embodiment, made with reference to the drawings, of which.

MORE DETAILED DESCRIPTION

The soils covered by the present invention relate to a solid body of dispersed matter essentially comprising inorganic compounds.

The pollutants covered by the present invention are generally present at a rate of a few percentile points in the polluted soils. They are essentially volatile organic compounds (halogenated solvents, benzenes and derivatives) but more particularly semi-volatile organic compounds (polynuclear aromatic hydrocarbons, total petrol hydrocarbons etc.), or heavy organic compounds (crude petroleum, oils, polychlorobiphenyls etc.).

The third substance which is a liquid substance used in the context of the present invention has a selective affinity for the pollutant. It may be formed by water with the addition, for example, of surfactants or complexating products. Nevertheless, it is preferably constituted by an organic solvent that enables a real dissolving of the pollutant and easily lends itself to regeneration by means of uncumbersome and reliable operations.

The solvents advantageously implemented in the method according to the invention are standard organic solvents such as alkanes, alcohols, ketones or other liquid organic solvents at ambient temperature and pressure. However, other solvents such as certain liquid gases at low temperature may be used, provided that certain adaptations, common in the technique considered, are made.

The method according to the invention comprises different steps. The soil is first of all prepared before being mixed with the third substance, and then it is separated from the polluted solution that has been formed. Once recovered, it is rinsed and dried while the third substance is regenerated.

The preparation of the polluted soils consists in excavating the polluted soils and in processing them so as to introduce, in the rest of the method, only particles having the desired grain size which is generally smaller than 5 mm and advantageously of the order of 3 mm. To this end, the large fragments, roots and big stones are first of all eliminated by screening. The lumps are crushed and the polluted soil is sieved.

Figure 1:
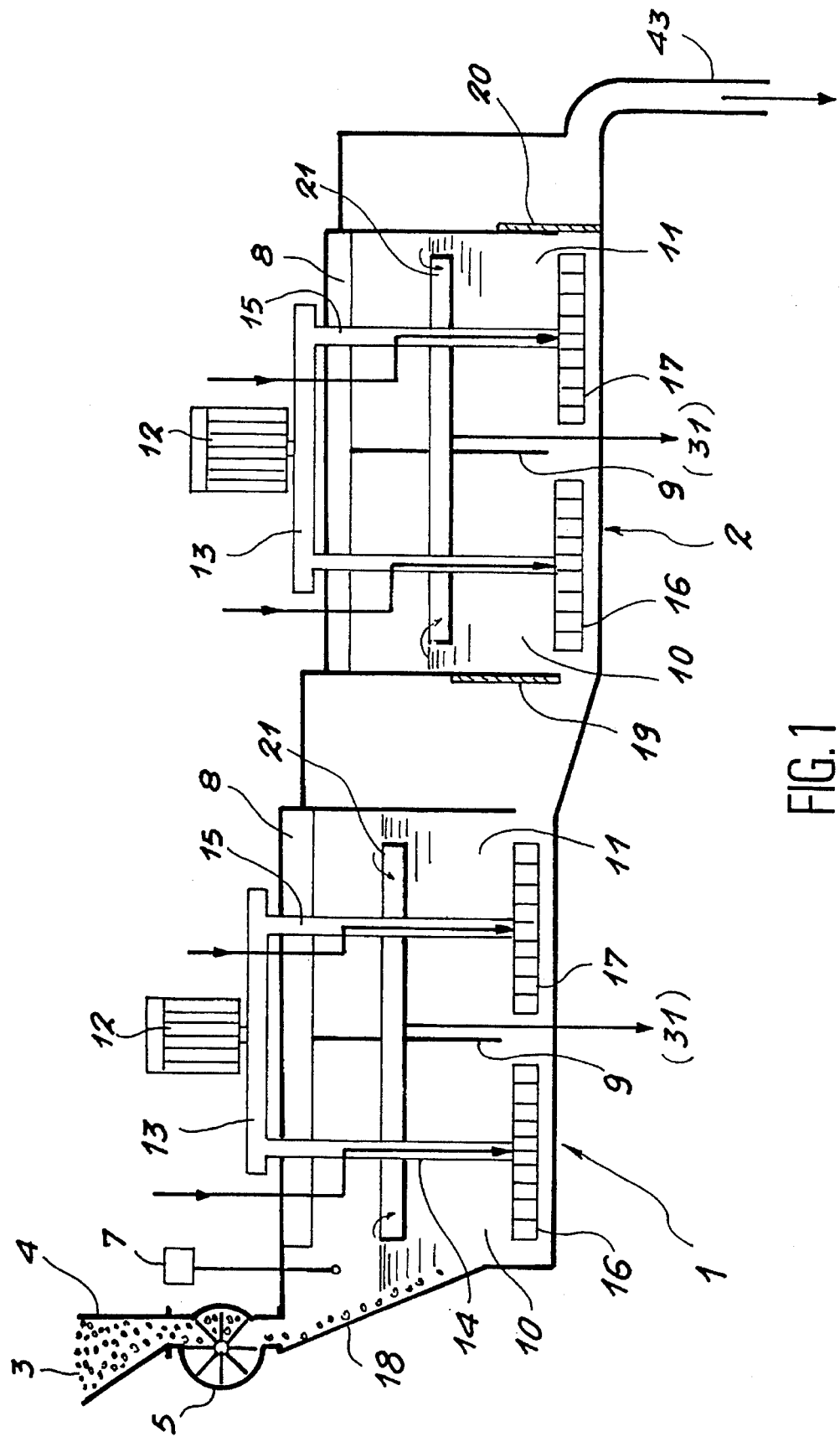
FIG. 1 shows a sectional view of a set of two contactors for the implementation of the method according to the invention.

The mixing is done in contactors referenced 1 and 2 in FIG. 1.

The polluted soils 3 are introduced into a hopper 4 connected by means of a rotary lock or rotary feeder 5 to the contactor 1.

Figure 2:
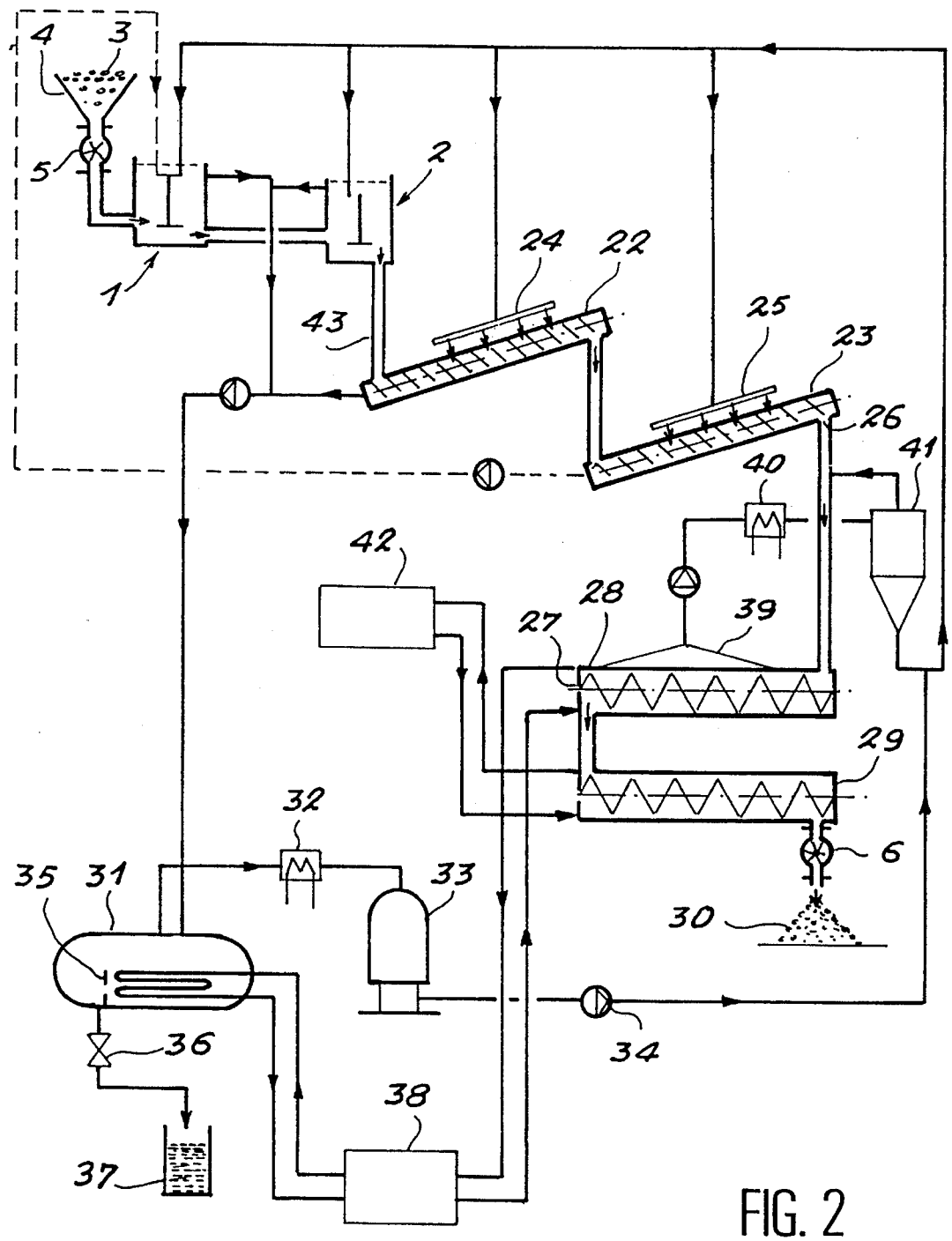
FIG. 2 shows a schematic view of the different means used in the implementation of the invention.

The rotary feeder 5 enables the polluted soils 3 to be introduced into the contactor 1 without any introduction of air, while a second feeder: referenced 6 in FIG. 2 enables the removal of the processed soils without a parallel removal of gas.

Since the installation is hermetically sealed, the method of the invention can be carried out under vacuum or in a confined atmosphere, for example under nitrogen. In this case, oxygen and/or nitrogen detectors 7, advantageously positioned at the input of the contactor 1, check the absence of oxygen or the nitrogen pressure.

The contactors 1 and 2 are manufactured according to the same model and are slightly offset with respect to each other, downwards, in the heightwise direction, the second contactor 2 being lower than the first contactor 1. The example of the present description comprises two contacts arranged in series, one after the other. However, the number of contactors can be greatly increased. In this case, each contactor n+1 is positioned so as to be slightly lower than the contactor n that precedes it. Each contactor is formed by a container that is closed by a lid 8 and has a partition 9 defining two contacting cells 10 and 11. A motor 12, positioned above and outside the lid 8, makes use of a horizontal element 13 to rotationally drive two hollow vertical shafts 14, 15 centered along the axis of each contacting cell. Each of these vertical shafts, at their lower part, at the low part of the contactor, supports a horizontal disk 16, 17 provided with blades represented in FIG. 1 by vertical lines. The lower part of a contactor or of said contacting cell corresponds substantially to the lower quarter of said contactor or of said contacting cell.

In one exemplary embodiment, a contactor is formed by two cells with a height of 760 mm, separated by a partition wall. Each cell has a rectangular 960 mm×930 mm cross-section. A disk with a diameter of 700 mm is positioned substantially at the center of the rectangle, at 70 mm from the bottom of the cell.

The third substance is introduced into the upper part of each hollow shaft 14 or 15 and flows into it before being injected into the lower part of each contacting cell, on the periphery of the disks 16 and 17, at numerous points, about 50 of them, along a plane that is substantially orthogonal to the axis of the contacting cells. The diameter of the disks 16 and 17 is advantageously greater than half the diameter of the contacting cells. The number of injection points is thus greater and the dispersal of the third substance is notably facilitated in the limited space between the blades of the disks and the lateral walls of the contacting cells.

The mixing is divided into two steps: the contacting and the extraction. These two steps take place at the lower part of the contacting cells.

The polluted soils are introduced along an inclined plane 18, in the lower part of the first contacting cell 10, preferably above the disk 16. Now, at this level, the dispersal of the third substance is extremely great since, firstly, the third body is injected substantially towards the side walls of the cells, substantially radially to said walls, and at numerous points, and secondly the third substance is immediately dispersed by the blades of the disks 16, 17 in rotation. Since the contacting is furthered by the dispersal, this method proves to be an excellent one.

The extraction, namely the placing of the pollutant in a solution, will then be done very easily since it is proportional to the contact surface between the pollutants and the third substance. Furthermore, the attrition will be limited and even non-existent in this type of method of mixing by dispersion, this will enable the production of fine particles to be limited to the maximum extent.

The separation between the polluted solution and the soil is done by the contactors themselves, continuously. Indeed, the dispersal does not generate high-powered fluid currents that could carry along soil particles to the upper part of the contacting cells, but causes a turbulence that is confined chiefly to the lower part of these cells. Consequently, a decantation in a separate step is not necessary. Owing to the rotation of the disk, the polluted soils will assume a circular motion and will pass from one cell to another of one and the same contactor through an aperture made at the bottom of the partition wall 9. The passage from a contactor 1 to the other contactor 2 is regulated by a register or shutter 19 that achieves a variable blocking of the inlet aperture of the second contactor. It is the downward offset position of the second contactor that enables this passage, the polluted soils being made, by their own weight, to descend by gravity towards the lowest contactor. Furthermore, the passage from one contactor to the next one and the continuous inlet of soil creates a current or flow of soil that fosters the passage between the cells of one and the same contactor. At the output of this contactor, a second register 20 enables the removal of the soil by gravity into the conduit 43 in order to rinse it. The contacting and the separation are done with a passage of polluted soil along several contactors 1, 2 arranged serially one after the other.

At the same time, the polluted solution migrates quite simply towards the upper part of the contactors, pushed back by the arrival of clean solvent. An overflow chute 21 enables the collection of the polluted solution in order to direct it to the inlet of the regeneration phase.

The system is particularly useful, because it is flexible and can be used notably to regulate the time during which the soils stay in the contactors, by means of the registers or shutters 19, 20.

The rinsing consists in replacing the polluted solution present in the soils removed through the conduit 43 by clean third substance.

This step of the method is done by two inclined screws 22, 23 continuously driving the soils under streams 24, 25 of third substance. The third substance that has been used for the rinsing in the inclined screws is recovered at the bottom of said screws and can advantageously be reintroduced at the contactors by means of a pump as shown in the case of the screw 23 by a line of dashes.

A squeezing-out operation is then carried out at the upper end of the inclined screw 23, by means of a piston pushed back by a counterweight or a spring, towards the soil samples reaching the level of said end. The soil samples are compressed by the piston which gradually withdraws. The excess third substance is removed, until the time when the squeezed soils fall by gravity into the hole 26 leading to the drying phase.

It will be observed that the soil samples going through the inclined screws 22 and 23 advantageously form plugs in said screws, providing for a certain imperviousness of the system.

The drying enables the elimination of the third substance which has not been squeezed out. The soils are introduced into a first screw 27, heated by a heat-transfer fluid flowing through the double envelope 28 of said screws and coming from a heat-regulating reservoir 38. Spatulas mix the soils inside the screw 27 and enable them to move towards the inlet hole of a second screw 29 that is built according to characteristics similar to those of the screw 27 but cools the soils by means of the circulation of cold water coming from a container 42.

At the end of the screw 29, a hole opening into the rotary feeder 5 enables the removal of the dry soils 30 without any removal of nitrogen.

When the third substance is a solvent, it is regenerated in order to be recycled in the installation.

The regeneration is done by simple distillation. The polluted solution coming either from the contactors 1 and 2 or from the rinsing screws 22 and 23 conveyed in a sprayer 31 in which there flows the heat-transfer fluid of the drier. The temperature in this sprayer is sufficient to enable the evaporation of the solvent which is then directed towards a condenser 32 and then a storage container 33.

A pump 34 will then feed the contactors 1, 2 and set up the streams 24, 25 of clean solvent.

The removal of the pollutant does not call for the stopping of the sprayer since this sprayer is separated into two parts by a partition 35. The polluted solvent enters the first part in which it is heated, then it passes by continuous overflow into the unheated second part in which the evaporation of the solvent is completed. A thermostatic valve 36, sensitive to the drop in temperature due to the accumulation of the pollutant discharges this pollutant, as and when it arrives, into barrels 37.

The vapors released at the drier 27 are recovered at a suction hood, then condensed by means of a condenser 40. A cyclone 41 will reintegrate the nitrogen at the conduit connecting the rinsing screw 23 to the drier 27, and will direct the clean solvent to the contactors 1, 2 or the streams 24, 25.

The results obtained are remarkable since a soil polluted by 10% of gasoil in mass and mixed according to the invention with 60% of a specific organic solvent adapted to the soil and to the pollutant is depolluted to more than 90% following the extraction made in the contactors.

Furthermore, the different elements of the installation have dimensions such that they can arranged so as to be implemented on the pollution sites, with a view to the processing of the soils in situ. The recovery of the utility fluids is one of the factors enabling this mobility. In the case of a mobile installation, the energy could naturally be given by an electrical generator set. The processing capacity of such a mobile installation is about four tonnes per hour.

What is claimed is:

1. A method for the rehabilitation of polluted soils, the method comprising:

introducing the polluted soils into a contacting cell;

the cell including lateral walls and a lower part, the lower part comprising approximately a lowest quarter of the cell;

injecting a liquid substance in a generally radial direction from within said cell outwardly towards the lateral walls of said cell;

forming a polluted solution of said liquid substance and pollutants from said soil;

collecting the polluted solution in an upper part of the cell;

such that soils from which said polluted solution has been removed are continuously separated from the polluted solution and are recovered at the lower part of said cell before being rinsed and dried.

2. The method according to claim 1, wherein the cell has an axis and the liquid substance is injected along a plane approximately orthogonal to the axis of the contacting cell.

3. A method according to claim 2, wherein the third body is injected at numerous points.

4. A method according to claim 3, wherein the third substance is an organic solvent, the method being then carried out in a confined atmosphere.

5. The method according to claim 4, wherein the polluted solution is collected by overflow.

6. The method according to claim 5, wherein contacting is done with a passage of the polluted soil along several contactors arranged one after another, in a series, and wherein each one of the contactors, except a first one, is disposed at a lower elevation than an immediately preceding contactor of the series from which it receives the soils.

7. The method according to claim 1, wherein the contacting cell includes in the lower part thereof a hole for injection of the liquid substance in a generally radial direction towards the side walls of said cell and an aperture for the removal of the polluted soils and an overflow chute in the upper part thereof.

8. The method according to claim 7, wherein the contacting cell comprises a shaft connected to a motor and bearing a horizontal disk provided with holes for the injection of solvent at its periphery.

9. The method according to claim 8 wherein the cell comprises at least two rotary feeders, one at an inlet of the polluted soils and the other at an outlet of clean soils from a drier or from a cooling mechanism.

10. The method according to claim 9, comprising several contactors arranged one after another in a series, and wherein each one of the contactors, except a first one, is disposed at a lower elevation than an immediately preceding contactor of the series from which it receives the soils.

11. An installation according to claim 7 comprising at least two rotary feeders, one at the inlet of the polluted soils and the other at the outlet of the clean soils from the drier or from the cooling mechanism.

12. The method according to claim 11, comprising several contactors arranged one after another in a series, and wherein each one of the contactors, except a first one, is disposed at a lower elevation than an immediately preceding contactor of the series from which it receives the soils.

13. The method according to claim 7, comprising several contactors arranged one after another, offset downwards.

14. The method according to claim 1, wherein the liquid substance is injected at about 50 points.

15. The method according to claim 14, wherein the liquid substance is an organic solvent, the method being then carried out in a confined atmosphere.

16. The method according to claim 14 wherein the plurality numbers about 50.

17. A method according to claim 1, wherein the liquid substance is an organic solvent, the method being then carried out in a confined atmosphere.

18. A method according to claim 17, wherein the polluted solution is collected by overflow.

19. The method according to claim 1, wherein the polluted solution is collected by overflow.

20. The method according to claim 19, wherein contacting is done with a passage of the polluted soil along several contactors arranged one after another, in a series, and wherein each one of the contactors, except a first one, is disposed at a lower elevation than an immediately preceding contactor of the series from which it receives the soils.

21. The method according to claim 1, wherein contacting is done with a passage of the polluted soil along several contactors arranged one after another, in a series, and wherein each one of the contactors, except a first one, is disposed at a lower elevation than an immediately preceding contactor of the series from which it receives the soils.

22. The method according to claim 1, wherein the liquid substance is injected from points situated at a periphery of a disk of the contacting cell.

23. The method according to claim 22, wherein the cell includes means for moving the disk in a rotating movement.

24. The method according to claim 23, wherein the liquid substance is dispersed by blades of the disk.

* * * * *